(12) United States Patent
Kaprosy

(10) Patent No.: US 9,104,699 B2
(45) Date of Patent: Aug. 11, 2015

(54) GREETING CARD DISPLAY SYSTEMS AND METHODS WITH HIERARCHICAL LOCATORS DEFINING GROUPS AND SUBGROUPS OF CARDS

(75) Inventor: Christine M. Kaprosy, Willoughby, OH (US)

(73) Assignee: American Greetings Corporation, Cleveland, OH (US)

( * ) Notice: Subject to any disclaimer, the term of this patent is extended or adjusted under 35 U.S.C. 154(b) by 3924 days.

(21) Appl. No.: 10/414,875

(22) Filed: Apr. 16, 2003

(65) Prior Publication Data

US 2003/0221159 A1 Nov. 27, 2003

Related U.S. Application Data

(62) Division of application No. 09/650,490, filed on Aug. 29, 2000, now abandoned.

(51) Int. Cl.
G09F 1/10 (2006.01)
G09F 7/18 (2006.01)
(Continued)

(52) U.S. Cl.
CPC ............ *G06F 17/30244* (2013.01); *G09F 1/10* (2013.01); *G09F 1/06* (2013.01);
(Continued)

(58) Field of Classification Search
CPC .............. G09F 1/10; G09F 1/14; G09F 7/10; G09F 7/18; G09F 15/00; G09F 3/20; G09F 1/12; G09F 21/04; G09F 23/00; G09F 3/201; G09F 7/04; G09F 7/08; G09F 7/12; G09F 11/02; G09F 11/06; G09F 13/22; G09F 15/0062; G09F 15/0068; G09F 15/0087; G09F 19/02; G09F 19/12; G09F 19/14; G09F 1/00; G09F 1/04; G09F 1/06; G09F 1/08; G09F 1/103; G09F 23/02; G09F 23/06; G09F 3/203; G09F 3/204

USPC ................. 40/124, 124.4; 211/50, 13.1, 49.1; 364/479.02; 705/1; 108/108; 715/853
See application file for complete search history.

(56) References Cited

U.S. PATENT DOCUMENTS 1,881,212 A * 10/1932 McKelvey ................. 211/85.17
2,304,756 A * 12/1942 Ames et al. .................... 312/118
(Continued)

FOREIGN PATENT DOCUMENTS

WO WO 9502867 A1 * 1/1995 .............. G06F 15/46

OTHER PUBLICATIONS

Cards 'in a Hurry', Supermarket Business, V. 53, N. 5, p. 106, May 1998.*
(Continued)

*Primary Examiner* — Ece Hur
(74) *Attorney, Agent, or Firm* — Christine Flanagan

(57) ABSTRACT

A greeting card display system and method presents cards in grouped arrangements by category and sub-category. Locator headers span multiple columns of a tiered matrix of card stations to define the area of a group of cards. Related groups of cards are relatively positioned in the display to facilitate customer location of cards of a particular category or subcategory. A header or megalocator, which defines a broad category or theme of cards such as "Birthday", extends over all of the columns of card stations of the display. Separate locators, beneath the header, extend over some of the columns of card stations below the header, and define a subcategory of cards such as "Birthday for Her". All of the cards under the subcategory locators are within the defined subcategory, until another locator is reached, defining another subcategory such as "Birthday for Mom". Because all of the cards of the subcategory defined by the locator are in stations directly below the locator, occasion-specific cards can be easily located on the display. The greeting card display system can also be implemented in an on-line retail environment.

33 Claims, 5 Drawing Sheets

(51) Int. Cl.

| | | |
|---|---|---|
| *G06F 3/048* | (2013.01) | |
| *G06F 17/30* | (2006.01) | |
| *G09F 1/14* | (2006.01) | |
| *G09F 15/00* | (2006.01) | |
| *G09F 3/20* | (2006.01) | |
| *G09F 23/00* | (2006.01) | |
| *G09F 13/22* | (2006.01) | |
| *G09F 1/06* | (2006.01) | |
| *G09F 19/14* | (2006.01) | |
| *G09F 21/04* | (2006.01) | |

(52) U.S. Cl.
CPC .. *G09F 1/14* (2013.01); *G09F 3/20* (2013.01); *G09F 3/201* (2013.01); *G09F 7/18* (2013.01); *G09F 13/22* (2013.01); *G09F 15/00* (2013.01); *G09F 15/0062* (2013.01); *G09F 15/0068* (2013.01); *G09F 15/0087* (2013.01); *G09F 19/14* (2013.01); *G09F 21/04* (2013.01); *G09F 23/00* (2013.01)

(56) References Cited

U.S. PATENT DOCUMENTS

| | | | | |
|---|---|---|---|---|
| 2,333,717 | A * | 11/1943 | Heed et al. | 312/50 |
| 2,532,600 | A * | 12/1950 | Broersma | 211/55 |
| 3,815,519 | A * | 6/1974 | Meyer | 108/61 |
| 3,892,450 | A * | 7/1975 | Kolster et al. | 312/117 |
| D265,024 | S * | 6/1982 | Johnson et al. | D6/672 |
| 4,460,097 | A * | 7/1984 | Darnell et al. | 211/189 |
| 4,613,047 | A * | 9/1986 | Bushyhead et al. | 211/55 |
| 4,905,845 | A * | 3/1990 | Broeker et al. | 211/55 |
| 4,938,366 | A * | 7/1990 | Carroll | 211/55 |
| 4,949,849 | A * | 8/1990 | Hardy | 211/55 |
| D327,590 | S * | 7/1992 | Hardy | D6/679 |
| 5,339,547 | A * | 8/1994 | Fogel | 40/124.01 |
| D351,076 | S * | 10/1994 | Eliadis et al. | D6/683.1 |
| D370,140 | S * | 5/1996 | Gaietto | D6/675.3 |
| 5,513,745 | A * | 5/1996 | Zoltan et al. | 206/741 |
| 5,555,496 | A * | 9/1996 | Tackbary et al. | 705/26.81 |
| 5,600,827 | A * | 2/1997 | Nakabayashi et al. | 1/1 |
| 5,649,216 | A * | 7/1997 | Sieber | 715/234 |
| 5,726,898 | A * | 3/1998 | Jacobs | 700/231 |
| 5,826,263 | A * | 10/1998 | Nakabayashi et al. | 1/1 |
| 5,875,110 | A * | 2/1999 | Jacobs | 700/232 |
| D412,253 | S * | 7/1999 | Brozak, Jr. | D6/683.1 |
| 5,924,367 | A * | 7/1999 | Henke et al. | 108/108 |
| 5,993,048 | A * | 11/1999 | Banks et al. | 700/233 |
| 6,039,576 | A * | 3/2000 | Gabig et al. | 434/367 |
| 6,044,365 | A * | 3/2000 | Cannon et al. | 707/741 |
| 6,141,666 | A * | 10/2000 | Tobin | 715/207 |
| 6,252,597 | B1 * | 6/2001 | Lokuge | 715/841 |
| 6,276,034 | B1 * | 8/2001 | Bachman et al. | 27/27 |
| 6,427,853 | B2 * | 8/2002 | Brozak, Jr. | 211/55 |
| 6,460,179 | B1 * | 10/2002 | Kretz et al. | 725/37 |
| 6,467,637 | B2 * | 10/2002 | Riga | 211/94.01 |
| 6,612,052 | B2 * | 9/2003 | Sawchuk | 40/124.01 |
| 7,213,206 | B2 * | 5/2007 | Fogg | 715/706 |
| 7,401,430 | B2 * | 7/2008 | Lindquist et al. | 40/657 |
| 7,620,563 | B2 * | 11/2009 | Tornaquindici | 705/7.29 |
| 7,702,542 | B2 * | 4/2010 | Aslanian, Jr. | 705/14.73 |
| 7,987,998 | B1 * | 8/2011 | Belk et al. | 211/55 |
| 8,943,719 | B1 * | 2/2015 | Post-Smith et al. | 40/124 |
| 2001/0044758 | A1 * | 11/2001 | Talib et al. | 705/27 |
| 2002/0099560 | A1 * | 7/2002 | Enfield | 705/1 |
| 2004/0055187 | A1 * | 3/2004 | Kerker et al. | 40/124 |
| 2006/0080613 | A1 * | 4/2006 | Savant | 715/745 |
| 2009/0234724 | A1 * | 9/2009 | Bates et al. | 705/14 |
| 2011/0126436 | A1 * | 6/2011 | Brozak et al. | 40/124.2 |
| 2012/0318759 | A1 * | 12/2012 | Buettner et al. | 211/55 |

OTHER PUBLICATIONS

Hammel, Frank, Greeting Cards, Supermarket Business, New York: Sep. 1992. vol. 47, Iss. 9, p. 121, Abstract.*

Cards 'in a Hurry', Supermarket Business, V.53, N. 5, p. 106, May 1998.*

* cited by examiner

| Megalocator Caption | Mealocators within Caption |
|---|---|
| JUVENILE | FOR BOYS |
| | FOR GIRLS |
| | BIRTHDAY FOR KIDS |
| FEMININE | MOTHER |
| | GRANDDAUGHTER |
| | NIECE |
| | COUSIN |
| | DAUGHTER |
| | GRANDMOTHER |
| | SISTER |
| | AUNT |
| CONVENTIONAL | BIRTHDAY FOR EVERYONE |
| | RELIGIOUS |
| COMMERCIAL | N/A |
| HUMOROUS | BIRTHDAY FOR LAUGHS |
| MASCULINE | FATHER |
| | BROTHER |
| | SON |
| | GRANDFATHER |
| | GRANDSON |
| | NEPHEW |
| | UNCLE |
| ROMANTIC | WIFE |
| | ROMANTIC |
| | HUSBAND |
| ANNIVERSARY | ANNIVERSARY |
| | SPECIAL ANNIVERSARY |
| WEDDING | WEDDING |
| | SHOWER |
| | ENGAGEMENT |
| BABY | BABY BOY |
| | BABY GIRL |
| | FOR NEW PARENTS |
| | SPECIAL OCCASIONS |
| THANK YOU/ CONGRATS | THANK YOU |
| | CONGRATULATIONS |
| | SPECIAL OCCASIONS |
| | WRITE YOUR OWN MESSAGE |
| CARE & CONCERN | GET WELL |
| | ENCOURAGEMENT |
| | SYMPATHY |
| $1.99 VALUE | N/A |

FIG. 5

GREETING CARD DISPLAY SYSTEMS AND METHODS WITH HIERARCHICAL LOCATORS DEFINING GROUPS AND SUBGROUPS OF CARDS

CROSS-REFERENCE TO RELATED APPLICATIONS

This application is a Divisional application of U.S. patent application Ser. No. 09/650,490 filed on Aug. 29, 2000 now abandoned.

FIELD OF THE INVENTION

The present invention pertains generally to methods and systems for displaying greeting cards and, more particularly, to a novel method and systems of hierarchical display of greeting cards in a retail or electronic retail environment.

BACKGROUND OF THE INVENTION

Retail displays of greeting cards have presented different categories of cards (such as Birthday, Thanks, Concern, Wedding, Congratulations, Mother's day, Valentine's Day, Christmas, etc.) in a standardized arrangement, which makes locating a particular card category rather tedious. The standard industry practice is to place a given category at the top of the display and arrange a series of subcategories in a snake-like continuous line formation under the first category, wherein subcategory titles are placed above the first greeting card in a given subcategory. In other words, subcategories are arranged in a one-dimensional manner: down the first column of cards, up the second column, down the third column, etc. Accordingly, a category might begin at the bottom of the second column and end at the top the third column. This one-dimensional arrangement scheme can be confusing, making it difficult or consumers to locate a desired type of greeting card. Also, cards of a particular category can be obscured within the continuum of the snake. The category headers may be only one card width wide, and located very low on the display.

Hierarchical organization schemes are used extensively in the computer industry, especially in software and database programming, such as described for example in U.S. Pat. Nos. 5,644,740; 5,838,319; and 6,046,742. More people use computers today than ever before, and most computers have an operating system with a graphical user interface (GUI). The GUIs of these operating systems allow the user to view a hierarchical directory structure in a graphical manner. Sometimes a hierarchical system is displayed in a tree view, while other times it is displayed via sequentially expandable two-dimensional boxes with items inside (windows), with headings or identifiers for each box. For example, if a user opens Item B, which is inside Window A, a new window, Window B, opens and displays the contents of Item B. This process continues throughout the directory structure.

Because of the influence of computers and the GUI systems, a hierarchical organization scheme is more intuitive to retail consumers than ever before. As electronic shopping via the Internet continues to grow, computer-adapted formats for presentation of product information are required. As computer speed, graphics and monitor resolution continue to improve, virtual computer displays of greeting cards (and other products) will be increasingly effective.

SUMMARY OF THE INVENTION

The present invention provides consumers with an intuitive organizational hierarchy that facilitates the location of a desired type of greeting card. The greeting card display system of the invention uses a hierarchical organizational scheme that enables a shopper to more rapidly find the type of greeting card desired, without searching up and down multiple columns of greeting cards. The system and method of the invention is employed in connection with one or more greeting card display racks, each rack having tiers of stepped shelves divided into card pockets or stations which hold several copies of the same card. At the top of each display unit is a category title which spans some or all of the columns of card stations of the display. Customer location of category-specific cards is facilitated by arranging cards of a display in groups identified by headers or locators which span across each of the stations or slots which hold cards of the identified category, and by proximately positioning related groups of cards. Rather than a series of categories displayed in a snake formation under the display unit title, the system and method of the invention organizes and displays the greeting cards in a grouped two-dimensional hierarchical system. Subcategories of cards are grouped two-dimensionally within the two-dimensional space occupied by the parent category. Furthermore, subcategories may contain further subcategories, which in turn are arranged two-dimensionally within such subcategory in the same manner in which the subcategory is arranged within the parent category.

In one embodiment of the invention, a greeting card display includes a display structure having a plurality of rows and columns of card-supporting stations, a megalocator which extends horizontally across a width of the display over the columns of stations, the megalocator identifying a category to which cards in each of the stations correspond; a first level group locator identifying a related subcategory of cards in stations below the megalocator, the first level group locator extending horizontally across one or more columns of stations; and a second level group locator identifying a related subcategory of cards in stations below or proximate to the stations of the first level group locator, the second level group locator extending horizontally across one or more columns of stations. More specifically, a display for cards of a particular category has a header or megalocator of "Birthday for Him" which extends across all of the columns of card stations in the display rack. Generic (e.g., non-age or relation specific) cards are placed in the stations directly below the header. A subcategory locator, such as "Father" is positioned below the megalocator/header, and extends over some of the columns of card stations. All cards in the stations below the subcategory locator (and above the next lower locator) are within the subcategory defined by the locator. Another locator, defining another subcategory such as "Grandfather" may be directly adjacent to the "Father" locator, or at a higher or lower elevation on the display, and also extending across several columns of card stations. A subtending locator may define a further subcategory, under either the header, or the superior locator. For example, the locators "Grandfather", "Father", "Son" and "Grandson" may be arranged in descending order.

In another aspect of the invention, a hierarchical system for displaying greeting cards has at least two organizational levels, a first level having at least one categorical group of cards and a second level having at least one related categorical group of cards; wherein each of the first level categorical groups has at least one related second level categorical group; wherein the first level categorical groups and the second level categorical groups are arranged and displayed two dimensionally; wherein each two dimensional second level categorical group arrangement is displayed within a two dimensional first level categorical group arrangement, and wherein the first level and second level represent any two adjacent levels of a hierarchical system.

These and other aspects of the invention are herein described with reference to the accompanying Figures which are representative of just a few of the ways in which the principles and concepts of the invention can be embodied.

DESCRIPTION OF THE FIGURES

FIG. 5 is list of representative names of locators which define categories or level groups of a greeting card display of the present invention.

DETAILED DESCRIPTION OF PREFERRED AND ALTERNATE EMBODIMENTS

A preferred embodiment of the present invention provides a rectangular hierarchical organizational system for the display of greeting cards. Rectangles have been chosen for the preferred embodiment because most greeting card displays and most greeting cards are rectangular in shape. Therefore, arranging the greeting cards in a rectangular formation leaves less unused space in the display and is more efficient than organizational systems which utilize other two-dimensional primary and secondary grouping arrangements, such as circular or triangular arrangements. However, other two dimensional grouping arrangements, such as circular, triangular, pentagonal, hexagonal, octagonal, etc., are certainly within the scope of the present invention. For example, if a display unit itself is triangular, a triangular grouping arrangement may be more efficient than a rectangular grouping arrangement. The described categorical grouping of cards is not limited to groups arranged in rectangles.

Figure 1:
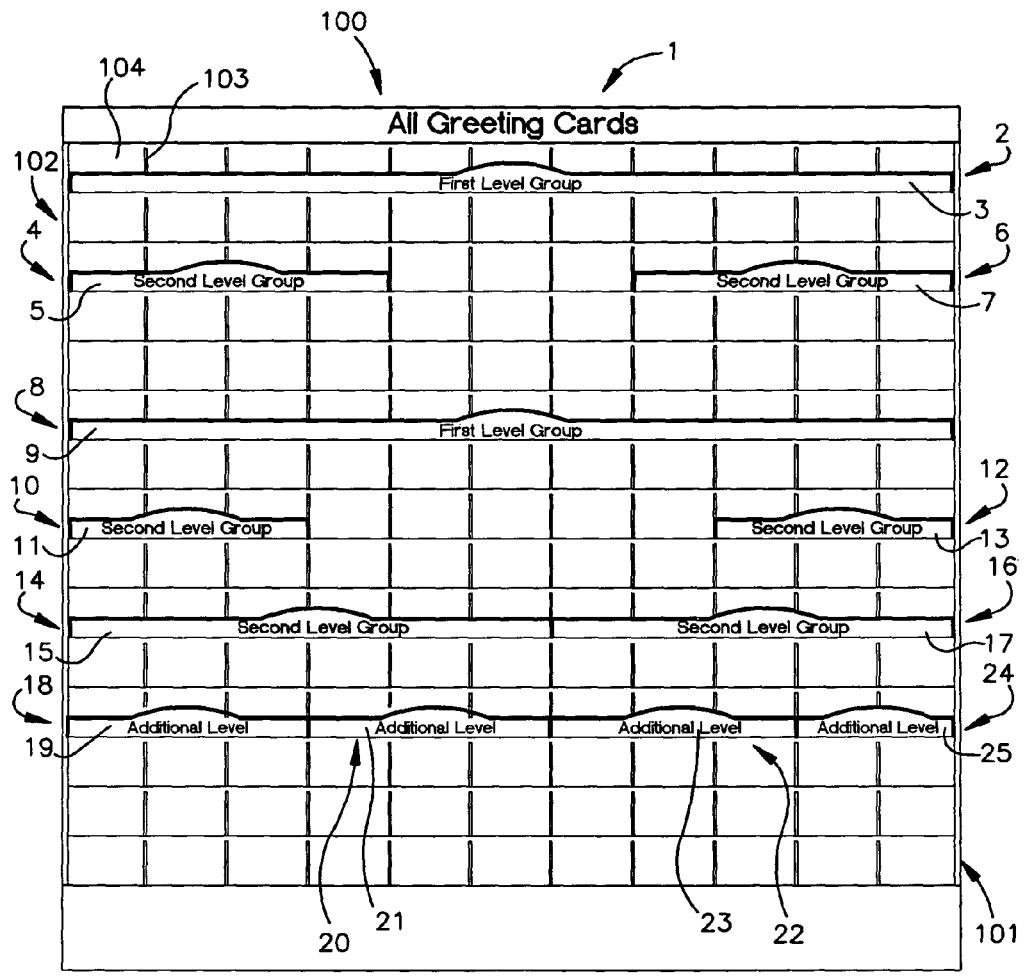
FIG. 1 is a front view of a display illustrating the organizational hierarchy and method of display in a preferred embodiment.
Figure 3:
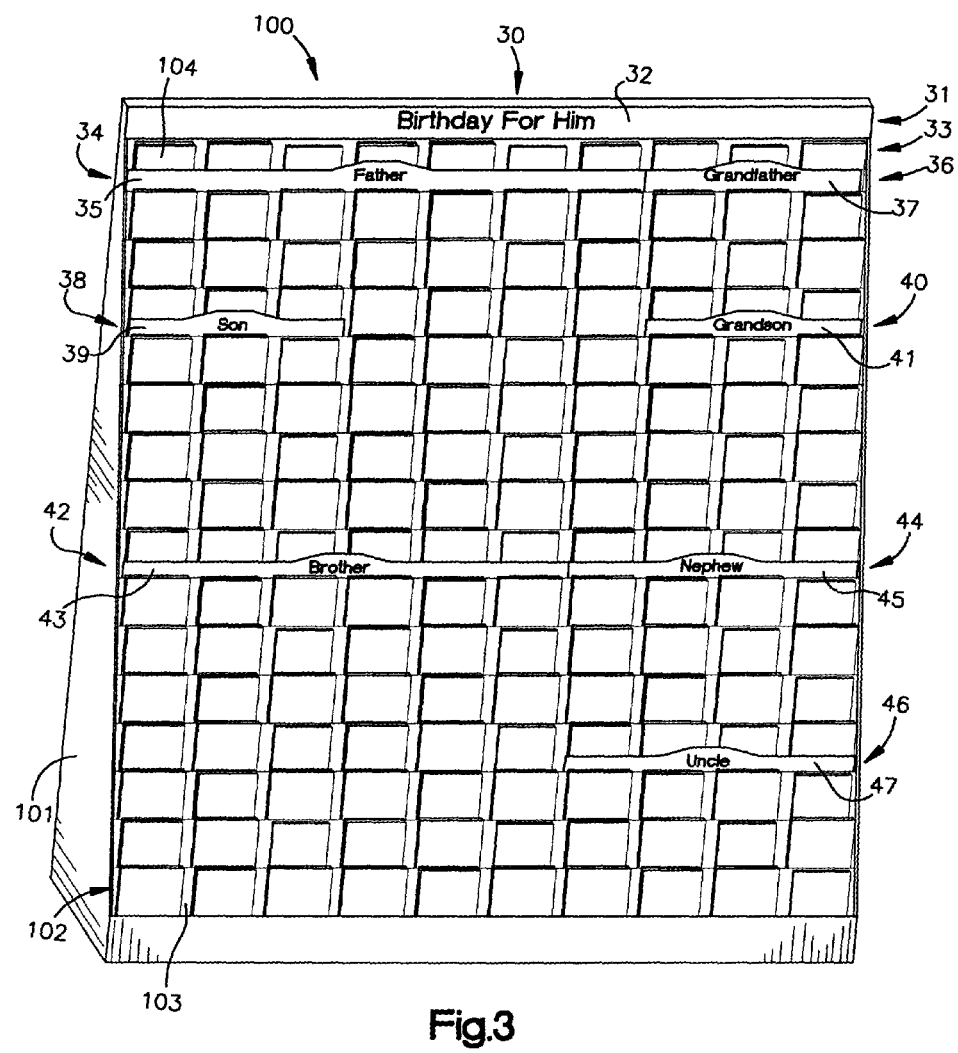
FIG. 3 is a perspective view of a display unit illustrating two levels of organization in a preferred embodiment.
Figure 4:
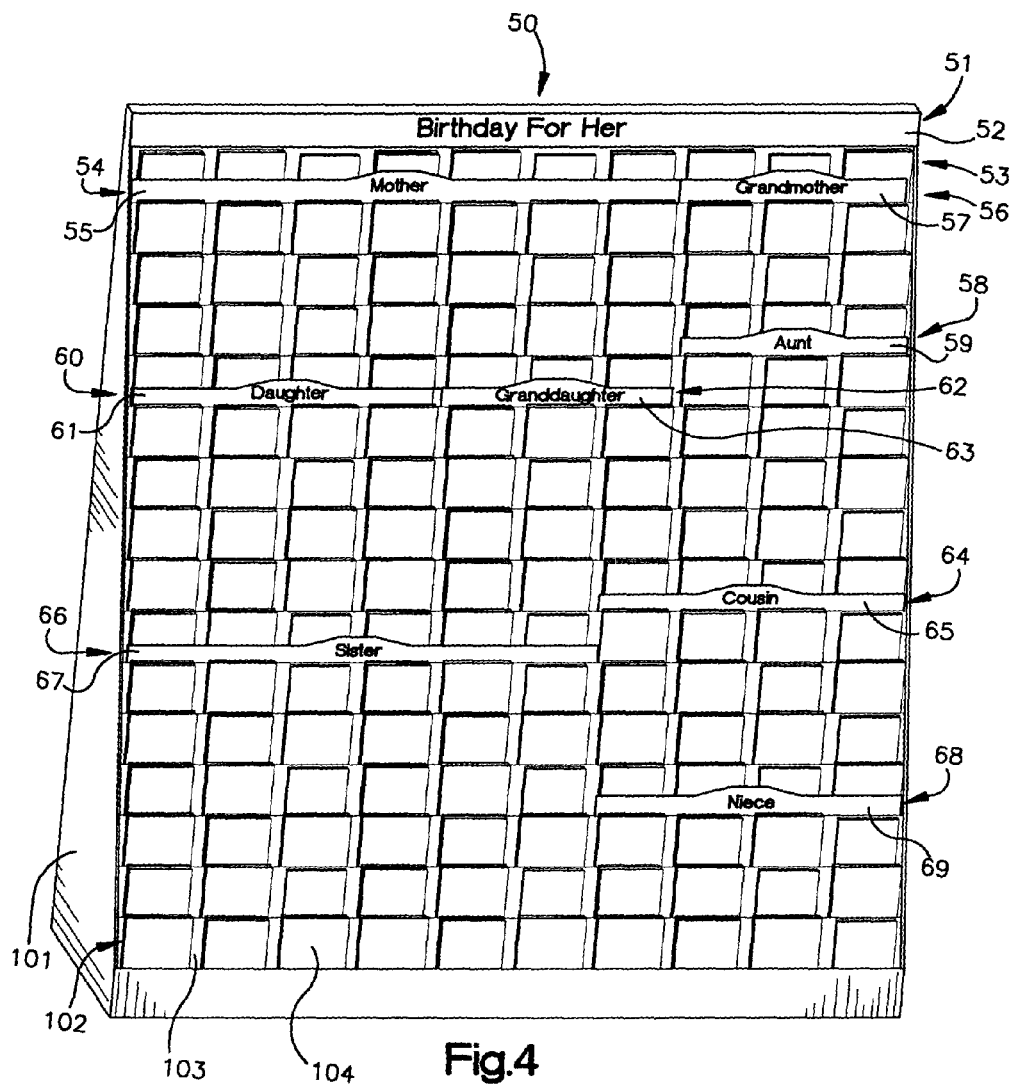
FIG. 4 is a perspective view of a display unit illustrating two levels of organization in a preferred embodiment.

As shown in FIGS. 1, 3 and 4, a typical greeting card display 100 has a generally upright frame structure 101 with a plurality of tiered horizontal rows 102. Each row 102 has a support surface or depth sufficient to accommodate a stock of at least several cards each with an accompanying envelope. The rows are divided horizontally into stations or pockets or slots 104, each dimensioned to hold multiple copies of the same card and envelope. The dividers 103 which define the stations 104 may be adjusted to the width of the cards to be displayed, thereby changing the total number of stations in a particular row. The vertical spacing of the rows 102 typically remains fixed. Multiple displays 100 can be arranged side-by-side to form a continuous wall or aisle display.

FIG. 1 depicts a preferred embodiment of a hierarchical card display system of the invention. Within a display unit, "megalocators" or "locators" are used to separate the various categories and subcategories of cards. A display header or megalocator 1 has a broad identifier of a particular occasion or category of cards, such as "Birthday" or "Congratulations" or "Wedding" or "Valentines", i.e., overall theme of all of the cards of the display. It is noted that card themes may also be non-event or non-occasion type cards such as "Friendship", "Romantic", "Miss You" or no-message cards. A first level group 2 represents a single subset or category of all greeting cards. All cards within the category of first level group 2 are positioned within a rectangular two-dimensional space underneath a subcategory locator 3. Second level groups 4 and 6 each contain a single category of first level group 2. All cards within the categories of second level groups 4 and 6 are placed underneath locators 5 and 7 respectively. According to the display system, cards of a given category are always placed underneath the locator of that category. Thus, any cards placed underneath locator 3 and either above or between locators 5 and 7 fall within the category of first level group 2, but not within either of the subcategories of second level groups 4 and 6. In a particular preferred embodiment, as shown, the second level groups, such as 4 and 6, and the corresponding locators 5 and 7, are bilaterally and symmetrically arranged. This is particularly effective in displays wherein the subject matter of second level groups are logically related, such as "Birthday Boy" and "Birthday Girl", in addition to being related to the subject matter of the first level group 2 (locator 3) e.g., "Birthdays".

Similarly, first level group 8 contains multiple second level groups 10, 12, 14 and 16, with the corresponding locators 11, 13, 15 and 17. Second level group 14 contains additional level groups 18 and 20 (with locators 19 and 21), and second level group 16 contains additional level groups 22 and 24 (with locators 23 and 25). The additional level groups 18 and 20 are subsets or subcategories of second level group 14, while additional level groups 22 and 24 are subcategories of second level group 16. The additional level groups follow the same hierarchical structure as the first and second level groups. The various levels of the hierarchical structure may be illustrated using locators of differing size, shape, colors, fonts, etc. In other words, first level group locators have a different appearance than do second level group locators, which in turn have a different appearance than do additional level locators. This allows the customer to visually differentiate the hierarchical levels of organization. A display may have several first level groups, some of which are under the highest or top first level group, such as first level group 8 under first level group 2. However, each category and subcategory is preferably in a common geometrical arrangement, such as the described blocks, which facilitates category and subject matter location by a shopper.

Figure 2:
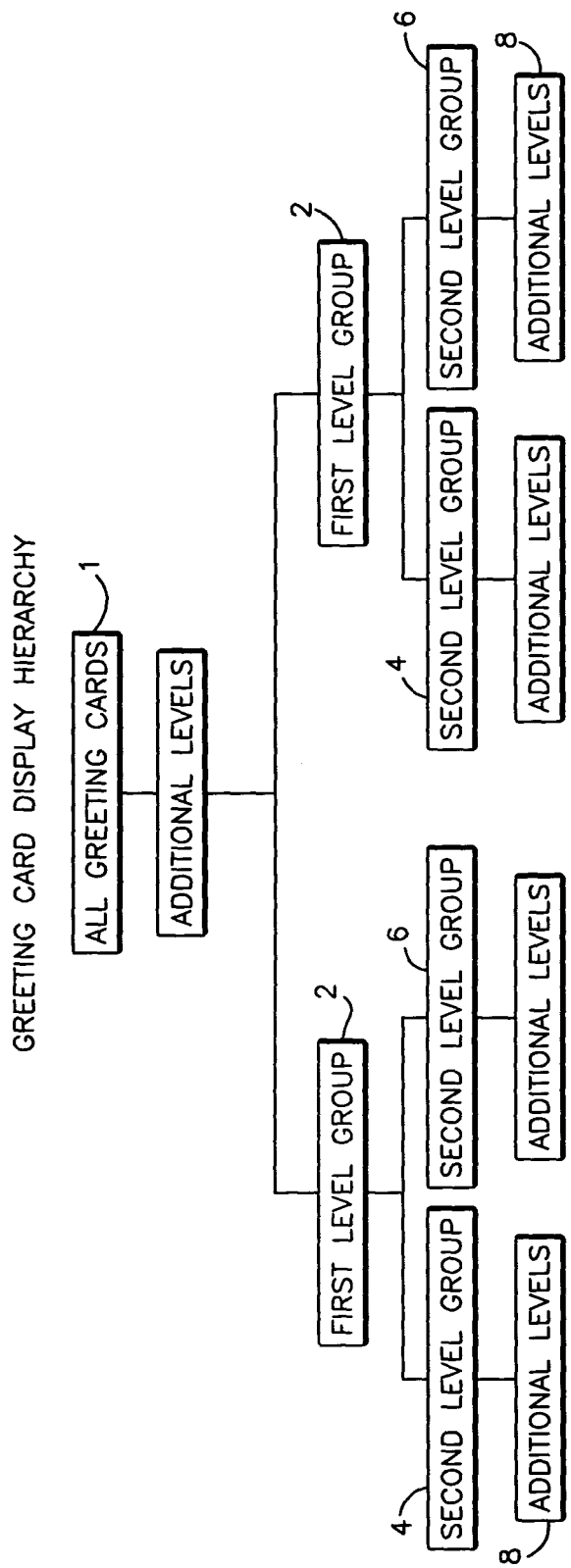
FIG. 2 is a flow chart illustrating the hierarchical organizational scheme.

FIG. 2 is an organizational chart for the present invention. As shown, additional levels may exist both above and below the first and second level groups 2, 4 and 6. According to the invention, there are preferably at least two hierarchical levels under the megalocator 1, as represented by first level group 2 and second level group 4. And the first and second level groups 2, 4 may be any two levels of organization, located anywhere within the hierarchical system.

FIG. 3 depicts a greeting card display unit 30 with a single first level group 31 defining the theme or subject matter for the entire display, identified by header/megalocator 32 "Birthday for Him" which spans the entire width of the display. A sub-categorically generic row or rows 33 may be provided below the header 32 for cards which are not subcategorically specific, e.g. cards having a generic male birthday theme or message. The seven second level groups are related to the subject matter defined by the header 32. The uppermost second level groups, "Father" 34 and "Grandfather" 36, identified by locators 35 and 37 may be positioned near or at the top of the display based upon market research which indicates that these are the most frequently sought cards in a particular retail environment. Also, as illustrated, the "Father" locator 35 and the corresponding block of card stations may be relatively larger than other blocks based on popularity or on the number of different cards within the category to be displayed. The additional second level groups: "Son" 38 (locator 39), "Grandson" 40 (locator 41) are bilaterally and symmetrically arranged at edges of the display, with additional "Father" cards in between. The "Brother 42" (locator 43) block is relatively large in size, with the smaller "Nephew" 44 (locator 45) and "Uncle" 46 (locator 45) groups laterally and hierarchically arranged. The megalocator 31 for "Birthday for Him" may be distinguishable in type or font from the other seven locators, which may have common elements of appearance, such as a blue background and common typeface or font.

According to the system, the greeting cards located in the rows immediately below the header 32 "Birthday for Him" and above the "Father" and "Grandfather" locators are members of the "Birthday for Him" first level group, and may or may not be members of any of the seven second level groups. For example, they may be generic masculine birthday cards. Because "Son" and "Father" are both second level groups as evidenced by their locators, the cards in the "Son" group are not a subset of the cards in the "Father" group. However, the cards to the right of the "Son" group are within the subset of the "Father" group. This illustrates that for space conservation reasons, some of the organizational groups may not be rectangles. However, they are always arranged two-dimensionally.

FIG. 4 illustrates another embodiment of the system and method of the invention, wherein display 50 is entirely of a single category "Birthday for Her" 51 (defined by header 52), with eight second level groups: Mother 54 (locator 55), Grandmother 56 (locator 57), Aunt 58 (locator 59), Daughter 60 (locator 61), Granddaughter 62 (locator 63), Cousin 64 (locator 65), Sister 66 (locator 67), and Niece 68 (locator 69). All eight second level groups may have locators similar in font, color, or other appearance characteristics. The locators of the second level groups are preferably visually distinguishable from the locator of the first level group. Also, it should be noted for some displays which have a large number of cards of a particular theme, as identified by a first level header or mega-locator, there may be more than one header with the same identifier, such as "Wedding", in rows at different elevations. This provides an additional category identifier at a different elevation for increased retail exposure.

FIG. 5 is a representative list of other various categories which can be arranged in accordance with the invention in the described hierarchical and grouped category displays. Column 100 lists representative megalocator card categories. Column 200 lists subcategories corresponding to the megalocator subject matter category, and which can be arranged in the described first, second and additional level groups, preferably in block arrangements with identifying locators.

The principles and concepts of the invention are readily adaptable to an on-line or computer-based environment, such as on an Internet web site. Cards can be selected by a computer user by category or subcategory listings, as set forth in FIG. 5, presented on a computer or terminal display screen, and/or by a graphical presentation of virtual card displays with images of cards presented in grouped categories and subcategories, defined by computer images of the described megalocators and locators. For example, the category/subcategory names of the megalocators or locators may be presented on a computer display in hyper text mark-up language (html) which provides a link to a corresponding list of cards such as FIG. 5, or a link to a graphics page containing images of the cards of a selected category. The individual cards of a category or subcategory may be presented as textual listings, or graphically presented in the described card station matrix. In a virtual on-line card shop arranged according to the invention, a composite image may appear of the described group category and subcategory card presentation, such as for example the entire frontal image of the displays depicted in FIGS. 3 and 4, for example on a web site on the World Wide Web of the Internet, accessed through a portal connection by a personal computer or terminal, including a processor, monitor, input device such as a keyboard, and a communications modem, and also having appropriate browser and communications software. The header or megalocator, and the subcategory locators, are graphically coded links to either lists or images of the cards in a selected category. The shopper selects a card by clicking on the displayed image, which links to an enlarged image of the card, pricing and delivery information, or related customization functions as known in the electronic retail commerce art. For example, once a card is located by clicking through the category, subcategory and card-specific display screens, a card customization function can be accessed to combine a selected or input greeting or message with the card graphic. The card delivery form, electronic or hard copy is then chosen and, with the recipient data input, the card delivered by the back end functionality of the web site. The billing may also be electronic.

Although the invention has been described in detail with respect to a preferred embodiment, it will be appreciated to those of skill in the art that certain modifications and variations of the inventive principles disclosed. In particular, alternative category groups may be utilized, while still conforming to the specified hierarchical structure. The display is highly effective in increasing retail sales by facilitating rapid location of the desired category of cards. The megalocators and locators immediately indicate that the display is arranged with categories in blocks. When the desired category block is not immediately located by the customer, the identification of a logically related category block is facilitated by the intuitive bilateral, symmetrical or hierarchical arrangement of the blocks. Also, the relatively large spatial area of the blocks makes them easier to locate than individual cards in a snaked arrangement.

What is claimed is:

1. A greeting card display device configured to display a plurality of greeting cards arranged according to categories and subcategories of events or occasions or greetings or intended recipients, the greeting card display device comprising:
   a display structure having a plurality of rows and columns of greeting card-supporting stations;
   a header which extends horizontally across a width of the display over the columns of stations, the header identifying a main category to which greeting cards in each of the stations correspond;
   a first level group locator identifying a first subcategory of greeting cards related to the main category and located in stations below the header, the first level group locator extending horizontally across one or more columns of stations below the header;
   and a second level group locator identifying a second subcategory of greeting cards related to the main category and to the first subcategory and located in stations below the stations of the first level group locator, the second level group locator extending horizontally across one or more columns of stations below the header and below the first level group locator;
   wherein the second level group locator is visually distinguishable from the first level group locator by differing size, shape, color or font.

2. The greeting card display device of claim 1 comprising at least two second level group locators at a common elevation on the greeting card display and below the first level group locator.

3. The greeting card display device of claim 1, wherein a second subcategory of greeting cards identified by one of the second level group locators pertains to an event or occasion.

4. The greeting card display device of claim 1 comprising at least two second subcategories of greeting cards each identified by a second level group located, wherein one of the second subcategories is related to males, and another of the second subcategories is related to females.

5. The greeting card display device of claim 1 further comprising at least one additional second level group locator spanning horizontally across one or more stations below another second level group locator.

6. The greeting card display device of claim 1, wherein all of the locators identify subcategories of greeting cards which have subject matter which is related to the category identified by the header.

7. The greeting card display device of claim 1, wherein first level group locators are positioned at a common elevation on the display device below the header.

8. The greeting card display device of claim 1, wherein second level group locators are positioned at a common elevation on the display device below the header and below the first level group locators.

9. A greeting card display device for displaying greeting cards in a store by arrangement in categories, and for grouping and displaying subcategories of cards related to the categories, the greeting card display device having:
  (a) a card display structure having a plurality of greeting card stations arranged in parallel rows and columns;
  (b) a header which spans across substantially all of the columns of the display, the header bearing an identity of a category to which greeting cards on the display pertain;
  (c) a first locator positioned below the header and spanning across at least two columns of greeting card stations of the display, the first locator bearing an identity of a first subcategory of greeting cards related to the particular category identified by the header;
  (d) a second locator positioned below the header and the first locator and spanning across at least two greeting card stations of the display, the second locator bearing an identity of a second subcategory of greeting cards related to the category identified by the header and related to the first subcategory identified by the first locator;
  wherein the second locator is visually distinguishable from the first level locator by differing size, shape, color or font; and
  wherein the greeting cards in the first subcategory and greeting cards in the second subcategory are visible simultaneously.

10. The greeting card display device of claim 9 further comprising an additional first locator positioned laterally with respect to the other first locator, the additional first locator bearing an identity of an additional first subcategory of cards related to both the category identified by the header and to the first subcategory identified by the other first locator.

11. The greeting card display device of claim 9 further comprising an additional second locator positioned laterally with respect to the other second locator, the additional second locator bearing an identity of an additional second subcategory of cards related to both the category identified by the header and to the second subcategory identified by the other second locator.

12. The greeting card display device of claim 10, wherein the first locator has a length different than the additional first locator.

13. The greeting card display device of claim 11, wherein the second locator has a length different than the additional second locator.

14. A greeting card display device for holding and arranging greeting cards by categories and subcategories for selection and purchase by a consumer in a store, the greeting card display device comprising:
  a display structure having a plurality of card pockets arranged in a rectangular formation with a plurality of rows and a plurality of columns of card pockets, each card pocket configured to hold one or more cards which pertain to a category or subcategory;
  a megalocator mounted on the display structure and positioned above one of the plurality of rows of card pockets of the display, the megalocator extending over a plurality of columns of card pockets and identifying a category of cards contained in the card pockets below the megalocator;
  a first level group of card pockets identified by a first level locator positioned below the megalocator, the first level locator extending over a fewer number of columns of card pockets than the megalocator and identifying a first subcategory of cards contain in the first level group of card pockets which are related to the category identified by the megalocator;
  wherein the greeting cards under the megalocator and the greeting cards under the first level locator are visible simultaneously.

15. The greeting card display device of claim 14, wherein the megalocator identifies a category of cards as cards for a birthday.

16. The greeting card display device of claim 14, wherein the first level locator identifies a first subcategory of cards by an identifier selected from the group of: grandfather, father, grandson, son, uncle, brother and nephew.

17. The greeting card display device of claim 14, wherein the first level locator identifies a first subcategory of cards by an identifier selected from the group of: grandmother, mother, granddaughter, daughter, aunt, sister and niece.

18. The greeting card display device of claim 14, wherein there is at least one row of card pockets between the megalocator and the first level locator.

19. The greeting card display device of claim 14 further comprising a second level locator positioned below the megalocator and extending over a fewer number of columns of card pockets than the megalocator and identifying a second subcategory of cards contained in a second level group of card pockets which are related to the category identified by the megalocator.

20. A greeting card display device comprising:
  a display structure having a plurality of card pockets arranged in a rectangular formation with a plurality of rows and a plurality of columns of card pockets, each card pocket configured to hold one or more greeting cards which pertain to a category or subcategory of greeting card subject matter;
  a megalocator on the display structure and positioned above one of the plurality of rows of card pockets of the display, the megalocator extending over a plurality of columns of card pockets and identifying a category of cards contained in the card pockets located below the megalocator;
  a first level group of card pockets identified by a first level locator positioned below the megalocator, the first level locator extending over a fewer number of columns of card pockets than the megalocator and identifying a first subcategory of cards contained in the first level group of card pockets which are related to the category identified by the megalocator;

a second level group of card pockets identified by a second level locator positioned below the megalocator and extending over a fewer number of columns of card pockets than the megalocator and identifying a second subcategory of cards contained in a second level group of card pockets which are related to the category identified by the megalocator, wherein the first level locator and the second level locator are arranged bilaterally and symmetrically and are logically related.

21. The greeting card display device of claim 20, wherein the second level locator is positioned over the same row of card pockets as the first level locator.

22. The greeting card display device of claim 20, wherein the second level locator is positioned over a different row of card pockets than the first level locator.

23. The greeting card display device of claim 20, wherein the second level locator extends over the same number of card pockets as the first level locator.

24. The greeting card display device of claim 20, wherein the second level locator extends over a different number of card pockets as the first level locator.

25. A greeting card display device comprising:
a display structure having a plurality of card pockets arranged in a rectangular formation with a plurality of rows and a plurality of columns of card pockets, each card pocket configured to hold one or more greeting cards which bear subject matter which corresponds with an identified category or subcategory of greeting cards;
a first megalocator positioned above one of the plurality of rows of card pockets of the display; the first megalocator extending over a plurality of columns of card pockets and identifying a category of cards contained in the card pockets below the first megalocator;
a second megalocator positioned above one of the plurality of rows of card pockets of the display, the second megalocator extending over a plurality of columns of card pockets and identifying a category of cards contained in the card pockets below the second megalocator;
a first level group of card pockets identified by a first level locator positioned below the first and second megalocators, the first level locator extending over a fewer number of columns of card pockets than the first or second megalocator and identifying a first subcategory of cards contained in the first level group of card pockets which are related to one of the categories identified by the first or second megalocators;
a second level group of card pockets identified by a second level locator positioned below the first and second megalocators, the second level locator extending over a fewer number of columns of card pockets than the first or second megalocator and identifying a second subcategory of cards contained in the second level group of card pockets which are related to one of the categories identified by the first or second megalocators,
wherein the greeting cards beneath the first and second megalocators and the first and second level locators are visible simultaneously.

26. The greeting card display device of claim 25, wherein the first megalocator and second megalocator are positioned above the same row of car pockets.

27. The greeting card display device of claim 25, wherein the first megalocator and second megalocator extend over a common number of columns of card pockets.

28. The greeting card display device of claim 25 comprising two first level groups of card pockets identified by two first level locators, one first level locator positioned below the first megalocator and another first level locator positioned below the second megalocator.

29. The greeting card display device of claim 28, wherein the two first level locators are positioned above the same row of card pockets.

30. The greeting card display device of claim 28, wherein the two first level locators are positioned above different rows of card pockets.

31. A greeting card display device for holding and displaying greeting cards according to themes or subject matters of greeting cards, the greeting card display device comprising a display structure with a generally upright frame structure and a plurality of individual card pockets arranged in tiered horizontal rows and columns, each row having a support surface and depth sufficient to accommodate a stock of at least several greeting cards and envelopes, and each row divided horizontally into pockets, each pocket dimensioned to hold multiple cards and envelopes;
a megalocator mounted on the display structure, the megalocator identifying a principal category of greeting cards contained within the card pockets of the display, the megalocator extending over each of the columns of card pockets of the display;
at least one row of card pockets located beneath the megalocator which includes card pockets in each of the columns or card pockets of the display for holding and displaying greeting cards which are within the principal category of greeting cards identified by the megalocator;
a first subcategory locator mounted to the display structure below the megalocator and below the at least one row of card pockets located beneath the megalocator which includes card pockets in each of the columns of card pockets of the display, the first subcategory locator extending over a fewer number of columns of card pockets of the display than the megalocator and identifying a first subcategory of cards which corresponds to the principal category of cards identified by the megalocator;
a second subcategory locator mounted to the display structure below the megalocator and below the first subcategory locator and below rows or card pockets below the first subcategory locator, the second subcategory locator extending over a fewer number of columns of card pockets of the display than the first subcategory locator and identifying a second subcategory of cards which corresponds to the principal category of cards identified by the megalocator and which corresponds to the subcategory of cards identified by the first subcategory locator;
wherein the megalocator, the first subcategory locator, the second subcategory locator and the greeting cards located under each locator are visible simultaneously.

32. The greeting card display device of claim 31 further comprising at least one additional first subcategory locator mounted to the display structure below the megalocator, the first subcategory locator mounted on the display structure below the megalocator, the first subcategory locator and the second category locator and below rows of card pockets below the second subcategory locator, the at least one additional first subcategory locator identifying an additional first subcategory of cards which is related to the principal category of cards identified by the megalocator.

33. The greeting card display device of claim 32 further comprising at least one additional second subcategory locator mounted to the display structure below the at least one additional first subcategory locator and below rows of card pockets located below the at least one additional first subcategory locator, the at least one additional second subcategory locator identifying an additional second subcategory of cards which is related to the principal category of cards identified by the megalocator and related to the at least one additional first subcategory of cards identified by the at least one additional first subcategory locator.

\* \* \* \* \*